Feb. 27, 1951   D. L. BROWN   2,543,566
SAFETY VALVE FOR GAS LINES
Filed March 17, 1948   2 Sheets-Sheet 1

Inventor
David L. Brown

By Clarence A. O'Brien
and Harvey B. Jackson
Attorneys

Feb. 27, 1951 D. L. BROWN 2,543,566
SAFETY VALVE FOR GAS LINES
Filed March 17, 1948 2 Sheets-Sheet 2
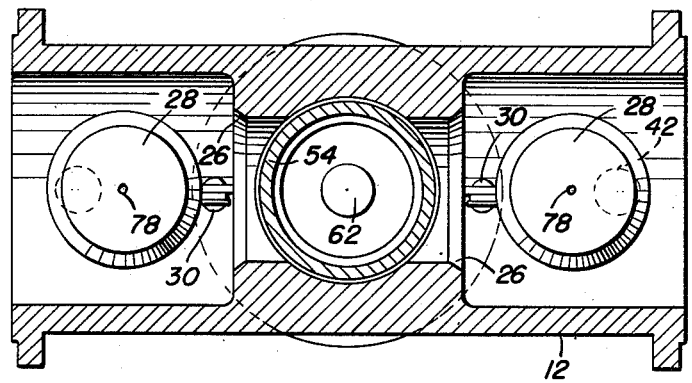
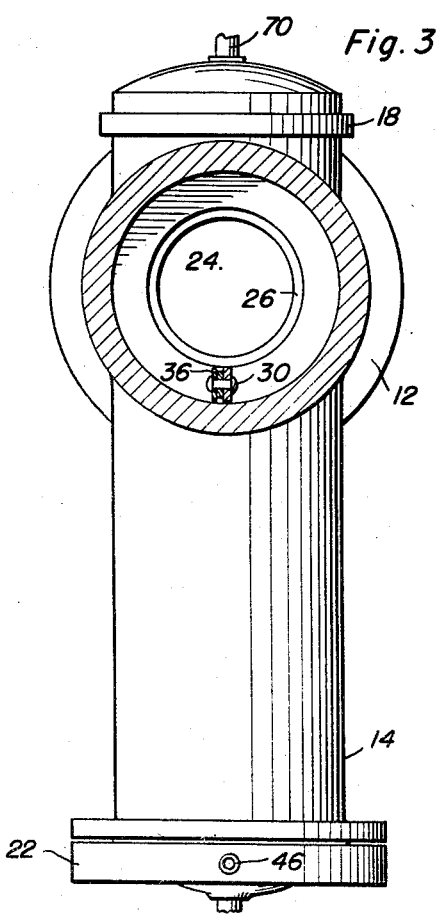
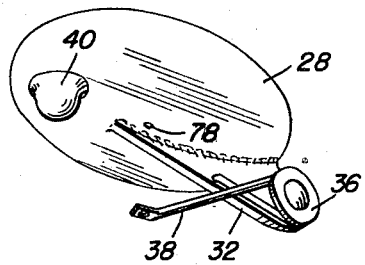
Inventor
David L. Brown Patented Feb. 27, 1951

2,543,566

UNITED STATES PATENT OFFICE 2,543,566

SAFETY VALVE FOR GAS LINES

David L. Brown, Shawnee, Okla.

Application March 17, 1948, Serial No. 15,401

8 Claims. (Cl. 137—153)

This invention relates generally to valves, more particularly to a valve assembly for use with gas lines of the type which are installed at intervals along a gas line and adapted to close automatically in the event of a rupture in the line, thus avoiding loss of gas.

A primary object of this invention is to provide an automatic valve shut off assembly particularly well adapted for use with high pressure gas lines such as are used for cross-country piping of gas at high pressures.

Another object of this invention is to provide a valve assembly which will close the two ends of a gas line section in which a rupture has occurred, the surge flow of gas into the ruptured section causing the actuation of the valve assembly, it being understood that the term section as here used will connote a length of gas pipe often in the order of ten miles long, although this invention may obviously be applied to analogous uses.

Another object of this invention is to provide a shut off valve in which a positive closure of the pipe line is effected.

Still another object of this invention is to provide a valve assembly of this general character and in which the valves are manipulable by the manual actuation of valves in a manifold incorporated with the valve assembly.

Still another object of this invention is to provide a shut off valve of this general character in which a cylinder is incorporated with the gas line, ordinarily by provision of a short length of pipe with the valve assembly associated therewith, and in which a positive closing of the gas line is effected by the movement of a plunger within this cylinder, while a pair of flap valves are adapted to close ports in the sides of this cylinder, this construction allowing the assembly to be light in weight and extremely simple to transport and install in a pipe line.

And a last object to be mentioned specifically is to provide a valve assembly of the type mentioned above which is relatively inexpensive and practicable to manufacture, which is safe, simple and substantially automatic in operation, and which will give generally efficient and durable service.

With these objects definitely in view, this invention resides in certain novel features of construction, combination and arrangement of elements and portions as will be hereinafter described in the specification, particularly pointed out in the appended claims, and illustrated in the accompanying drawings which form a material part of this application, and in which:

Figure 2 is a horizontal sectional view, taken on a plane through the section line 2—2 in Figure 1 and looking in the direction of the arrows;

Figure 3 is a vertical transverse sectional view, taken on the line 3—3 in Figure 1, the major portion of the elements in this figure being illustrated in side elevation; and Figure 4 is a three dimensional view of one of the flap valves with the spring whereby this valve is biased into open position.

Similar characters of reference designate similar or identical elements and portions throughout the specification and throughout the several views of the drawings.

Figure 1:
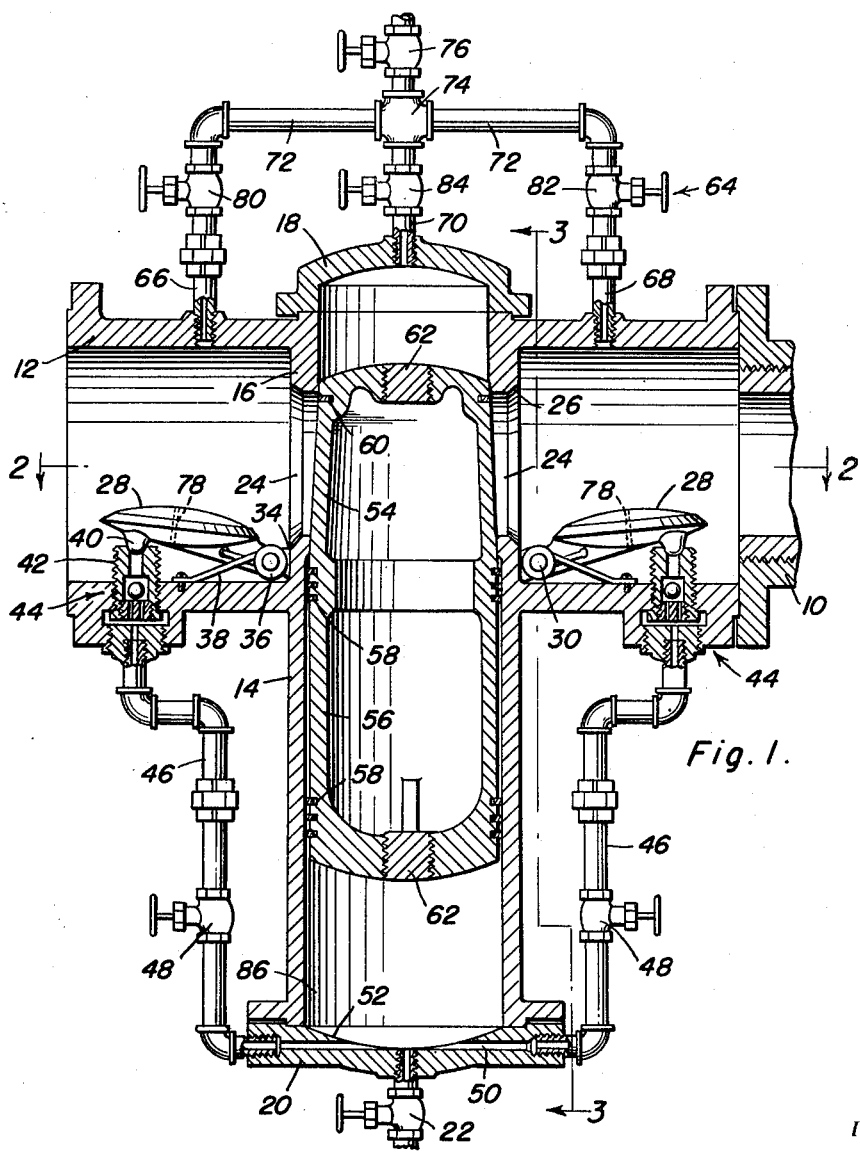
Figure 1 is a vertical sectional view of this improved valve assembly, with a fragmentary terminal portion of a gas line shown connected to one end of the assembly, the plunger valve being illustrated in closed position.

Referring now the drawings in detail, the environment wherewith this invention is adapted to be used will include a gas line which is fragmentarily represented at 10. This invention envisages provision of a short length of pipe 12 adapted to be connected in the gas line 10 and having a cylinder 14 integrally and transversely incorporated therewith, portions of this cylinder extending within the pipe 12, as indicated at 16, as well as extending outside the pipe 12. The ends of the cylinder 14 are closed by caps 18 and 20 and a drain valve 22 is provided on the cap 20.

The sides of the portion 16 of the cylinder 14 within the pipe 12 are provided with ports 24 having valve seats 26 for a pair of similar flap valves 28 which are pivotally secured to sides of the cylinder by means of pivot pins 30, web flanges 32 on the backs of the flap valves and apertured lugs 34 on said cylinder, the web flanges terminating in annular members 36 which are grooved to receive intermediate portions of springs 38 terminally secured to the web flanges 32 and to adjacent portions of the pipe 12, as clearly indicated in Figure 1, so as to bias the flap valves into open position.

Each of the flap valves 28 carries a plug 40 on the back thereof adapted to close the upper end of channels through bushings 42 comprising the inner ends of check valves generally indicated by the numeral 44 and mounted in suitable apertures in the pipe 12 adjacent to the flap valves 28. It will be noted that each of these check valves 44 is closed by the flap valves 28 when the latter are in open position and each of these check valves is adapted to close whenever gas moves with surge velocity in one direction. By-passes 46 each having a manual control valve 48 connect the check valve 44 with the cap 20, and the cap has channels 50 leading from the by-passes 46 to a dash pot portion 52 of the cap.

The valve plunger 54 has an extending portion 56 of piston-like character and provided with pressure sealing rings 58, while the reduced end of the plunger 54 is also preferably provided with a pressure sealing ring 60. The plunger 54 may be cast hollow but the end of the plunger must be tightly sealed, as by plugs 62.

In order that the valve assembly may be manually controlled, a manifold generally indicated by the numeral 64 is connected, preferably to the upper side of the pipe 12 and to the cap 18, by means of depending conduits 66, 68 and 70. The main connecting pipe 72 has a four way nipple 74, and a waste valve 76 as well as a conduit 70 and the two portions of the connecting pipe 72 are all connected to this nipple 74. The flap valves 28 are each provided with a small diameter channel 78, the purpose of which will be made clear presently and each of the conduits 66, 68 and 70 are provided with manually operable valves 80, 82 and 84.

The operation of this invention will now be briefly described. When a rupture occurs in the gas line 10, on either side of the valve assembly, gas will flow with a great surge in one direction through the pipe 12. This surge flow will cause one of the flap valves 28 to close the corresponding port 24, temporarily substantially sealing the gas line and simultaneously opening the channel through the bushing 42 and the check valve 44, opening the corresponding by-pass 46 and channel 50, thus allowing admission of high pressure gas into the end 86 of the cylinder 14. The plunger valve 54 will thus be forced into closed position as indicated in Figure 1. It should be noted in this connection that the check valve 44 adjacent to the rupture in the gas line will tend to remain closed due to the action of the rapidly flowing gas on the corresponding flap valve 28 and the ball check in the check valve itself will close in the event that gas flows from the dash pot portion 52 of the cylinder toward this check valve, and a building up of pressure in the end 86 of the cylinder 14 is thus assured. The small diameter channel 78 in the closed flap valve 28 allows the pressure to equalize on each side of the flap valve after plunger valve 74 is in closed position, and the spring 38 associated with this particular flap valve will return the same to the position indicated in Figure 1.

When it is desired to operate the valve assembly manually, the plunger valve 54 may be closed by closing the manual valves 80 and 82, opening the valve 84 and then opening the waste valve 76 which will be of quick opening type, so that a surge flow of gas will occur through the conduit 70. Both flap valves 28 will, therefore, close and pressure will be transmitted through both legs of the by-pass 46 into the end 86 of the cylinder 14, forcing the plunger valve 54 into closed position. To open the valve assembly manually the waste valve 76 is closed, and valves 80 and 82 are opened. Pressure will quickly equalize at both ends and at the sloping side of the plunger valve and this valve will fall by gravity into its open position when the valve assembly is positioned as indicated in Figure 1.

Minor variations in the details of construction and proportionment of the various elements of this invention may be resorted to without departure from the spirit and scope of this invention and the drawings are to be considered as illustrative rather than limiting. Accordingly, this invention should be limited only as determined on a proper interpretation of the terms used in the subjoined claims.

Having described the invention, what is claimed as new is:

1. A valve assembly for use with gas lines and comprising a cylinder incorporated with a gas line and having a plunger valve adapted to close said gas line when in one position, a pair of normally open valves on each side of said plunger valve adapted for selective actuation by a surge flow of gas to close the line temporarily, and by-passes selectively opened by said actuation leading from said line to one end of said cylinder, said by-passes having means closing the by-passes during normal operation.

2. A valve assembly for use with gas lines and comprising a cylinder incorporated with a gas line and having a plunger valve adapted to close said gas line when in one position, a pair of normally open valves on each side of said plunger valve adapted for selective actuation by a surge flow of gas to close the line temporarily, and by-passes selectively opened by said actuation leading from said line to one end of said cylinder, said by-passes having means closing the by-passes during normal operation, said pair of valves being spring biased flap valves and having small openings therethrough allowing equalization of pressures on the two sides thereof and the opening thereof after said plunger valve closes.

3. A valve assembly for use with gas lines and comprising a cylinder incorporated with a gas line, and having a plunger valve adapted to close said gas line when in one position, a pair of normally open valves on each side of said plunger valve adapted for selective actuation by a surge flow of gas to close the line temporarily, and by-passes selectively opened by said actuation leading from said line to one end of said cylinder, said by-passes having means closing the by-passes during normal operation, said by-passes having check valves to prevent gas entering said cylinder from one by-pass escaping therefrom through the other by-pass.

4. A valve assembly for use with gas lines and comprising a cylinder incorporated with a gas line and having a plunger valve adapted to close said gas line when in one position, a pair of normally open valves on each side of said plunger valve adapted for selective actuation by a surge flow of gas to close the line temporarily, and by-passes selectively opened by said actuation leading from said line to one end of said cylinder, said by-passes having means closing the by-passes during normal operation, a manifold having conduits communicating with the gas line on each side of said plunger valve, a conduit communicating with the other end of said cylinder, and a waste valve, and manually operated valves in each of said conduits.

5. A valve assembly according to claim 2 and wherein said cylinder is disposed transversely of said gas line and has ports in the sides thereof adapted to be closed by the flap valves in one position.

6. A valve assembly for use with gas lines and comprising a cylinder incorporated with a gas line and having a plunger valve adapted to close said gas line when in one position, a pair of normally open valves on each side of said plunger valve adapted for selective actuation by a surge flow of gas to close the line temporarily, and by-passes selectively opened by said actuation leading from said line to one end of said cylinder, said by-passes having means closing the by-passes during normal operation, said means comprising valves operated by said normally opened valves.

7. A valve assembly for use with gas lines and comprising a cylinder incorporated with a gas line, and having a plunger valve adapted to close said gas line when in one position, a pair of normally open valves on each side of said plunger valve adapted for selective actuation by a surge flow of gas to close the line temporarily, and by-passes selectively opened by said actuation leading from said line to one end of said cylinder, said by-passes having check valves to prevent gas entering said cylinder from one by-pass escaping therefrom through the other by-pass, said means comprising tubular members extending from said check valves into said line, and plugs on said normally opened valves normally closing said members.

8. A valve assembly for use with gas lines and comprising a cylinder incorporated with a gas line, and having a plunger valve adapted to close said gas line when in one position, a pair of normally open valves on each side of said plunger valve adapted for selective actuation by a surge flow of gas to close the line temporarily, and by-passes selectively opened by said actuation leading from said line to one end of said cylinder, said by-passes having check valves to prevent gas entering said cylinder from one by-pass escaping therefrom through the other by-pass, said means comprising tubular members extending from said check valves into said line, and plugs on said normally opened valves normally closing said members, said normally opened valves being spring biased into open position.

DAVID L. BROWN.

REFERENCES CITED

The following references are of record in the file of this patent:

UNITED STATES PATENTS

| Number | Name | Date |
|---|---|---|
| 772,919 | Bowman | Oct. 25, 1904 |
| 772,951 | Morrison | Oct. 25, 1904 |
| 772,952 | Morrison | Oct. 25, 1904 |
| 838,055 | Pitts | Dec. 11, 1906 |
| 938,574 | Goldsmith | Nov. 2, 1909 |
| 1,394,332 | Myer | Oct. 18, 1921 |